Oct. 26, 1926.   1,604,892
P. A. ENGLE
AUTOMOBILE TRUCK BED OR TURTLEBACK
Filed August 21, 1924   2 Sheets-Sheet 1
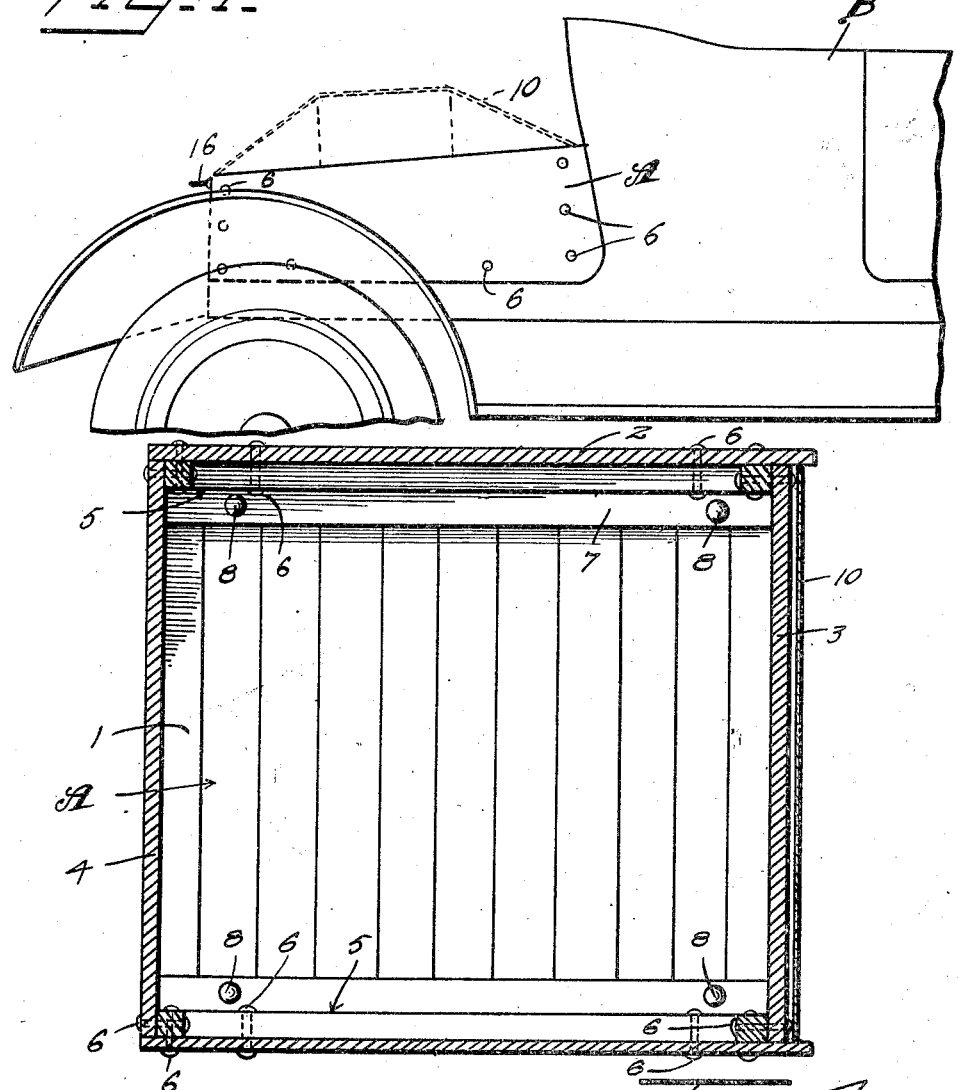
Inventor
P. A. Engle.
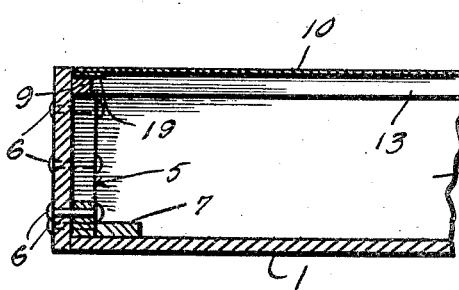
Attorney

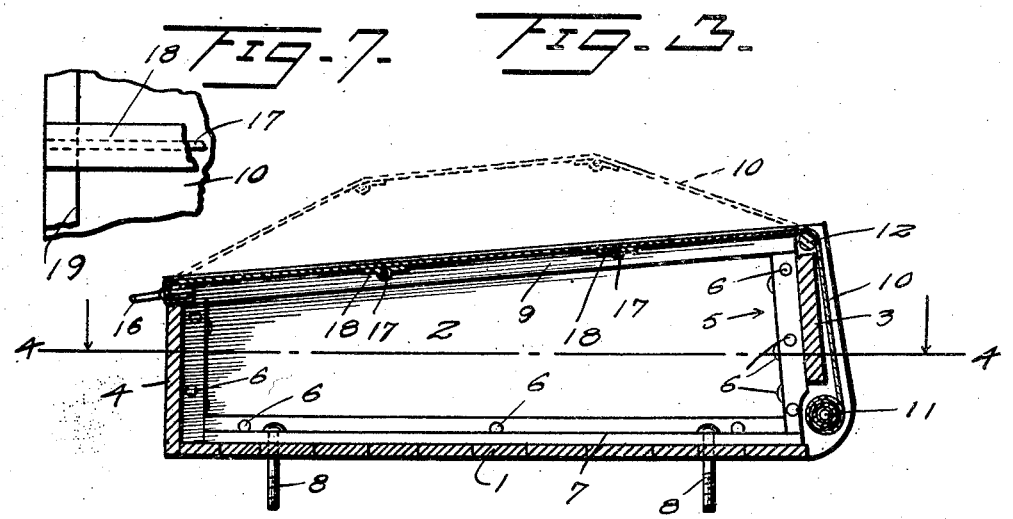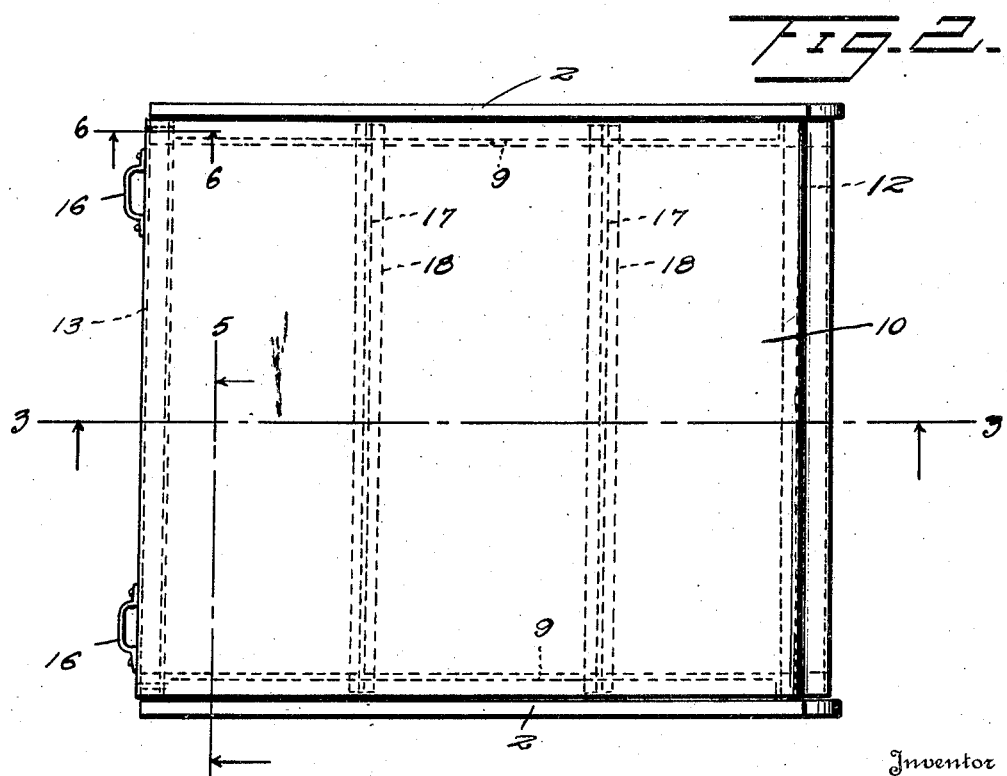

Patented Oct. 26, 1926.

1,604,892

UNITED STATES PATENT OFFICE.

PRISE A. ENGLE, OF CARLOS, INDIANA.

AUTOMOBILE TRUCK BED OR TURTLEBACK.

Application filed August 21, 1924. Serial No. 733,380.

This invention relates to truck beds or turtle backs for automobiles of that type known as roadsters.

The invention has for one of its objects the provision of a strong, durable and efficient device of this character that may be readily and firmly secured upon and to the chassis of an automobile of the roadster type in the rear of the seat thereof.

A further object of the invention is the provision of a device of the character stated which shall be adapted to receive and house articles having vertical dimensions greater than its depth.

A still further object of the invention is the provision of a device of the character stated into and from any part of which an article may be readily placed or removed.

With the above and other objects in view, the invention consists of the construction, combination and arrangement of parts hereinafter fully described and claimed, and illustrated in the accompanying drawings, wherein:

Figure 1 is a fragmentary portion of an automobile of the roadster type equipped with a truck bed or turtle back constructed in accordance with my invention, Figure 2 is a detail top plan view of the truck bed or turtle back, Figure 3 is a sectional view taken on the vertical plane indicated by the line 3—3 of Figure 2, Figure 4 is a sectional view taken on the horizontal plane indicated by the line 4—4 of Figure 3, Figure 5 is a sectional view taken on the vertical plane indicated by the line 5—5 of Figure 2, Figure 6 is a sectional view taken on the vertical plane indicated by the line 6—6 of Figure 2, and Figure 7 is a bottom plan view of a fragmentary portion of the cover, illustrating the manner in which the reinforcing rods of the cover are secured in place.

As shown in the drawings, the truck bed or turtle back, comprises a bottom 1, lateral sides 2, a front side 3, and a rear side 4. These parts are secured to side frames 5 by bolts 6. The bottom 1 is preferably of sectional formation, and cleats 7 are secured to the inner side thereof. Bolts 8 through the medium of which the truck bed or turtle back is secured upon and to the chassis of an automobile of the roadster type in rear of the seat thereof, pass through the cleats 7 and through the bottom 1.

The upper side of the truck bed or turtle back is fully opened and its lateral sides 2 extend forwardly beyond its front side 3 and upwardly beyond the top members 9 of the frames 5. A flexible cover 10 of waterproof canvas or any other material suitable for the purpose is provided for the upper open side of the truck bed or turtle back. The cover 10 is secured at one end to a spring roller 11 which is mounted on and between the lower corners of the front projecting ends of the lateral sides 2. The cover 10 extends upwardly from the roller 11 in front of the front side 3 to a roller 12 over which it passes in a rearward direction to the rear side 4. At its rear or free end, the cover 10 has connected thereto a stick 13 which is provided with openings 14 for the reception of pins 15 carried by the rear ends of the frame members 9. When the cover 10 is in closed position, the spring of the roller 11 is under tension, and due thereto there is no possibility of the accidental disconnection of the stick 13 from the pins 15. To permit the cover 10 to be engaged with or disengaged from the pins 15, to permit it to be moved into closed position, and to control its movement from closed to opened position under the influence of the spring roller 11, grips 16 are secured to the rear side of the stick 13. To prevent that portion of the cover 10 which overlies the upper open side of the truck bed or turtle back from sagging, transversely extending rods 17 are secured to the under side of said portion by means of strips 18 of any suitable flexible material. The rod retaining strips 18 may be secured in place by an adhesive or by stitching or in any other suitable manner. The lateral edges of the cover 10 are turned in and secured to the under side of the cover as shown at 19 in Figure 7. The terminals of the reinforcing rods 17 are located between the cover 10 and the turned in portions 19 thereof. The frame members 9 provide rests and slides for the lateral edges of the cover 10. The truck bed or turtle back is adapted to be secured to an automobile in the manner shown in Figure 1. In this figure A designates the truck bed or turtle back and B a fragmentary portion of an automobile of the roadster type.

Due to the fact that the cover 10 is flexible and secured at one end to the spring roller 11, the truck bed or turtle back is adapted to receive and house articles having verticle dimensions greater than the depth thereof. When the truck bed or turtle back contains such an article or articles, that portion of the cover overlying the open upper side of the device assumes the upwardly deflected position illustrated by dotted lines in Figure 3. It should also be understood that the cover may be readily moved into and secured in closed position, and that it may be readily detached from the pins 15 and permitted to be moved into opened position by the roller 11. The bottom, and sides of the device may be made of wood, metal or any other suitable material.

It should also be understood that the drawings are merely illustrative and do not pretend to give exact proportions. Furthermore, the said drawings are illustrative of a preferred construction, it being my expectation that vairous changes and modifications may be made as are within the spirit and scope of the invention.

What is claimed is:—

An automobile truck bed comprising a bottom, front, rear and lateral sides, the lateral sides extending forwardly beyond the front side and upwardly beyond the front and rear sides, members secured to the inner surfaces of the lateral sides below the upper edges thereof, pins carried by the rear ends of the members, a spring roller carried by the extended end portions of the lateral sides below the upper edge of the front side, a guide roller carried by the lateral sides above the upper edge of the front side, a stick resting upon the upper edge of the rear side and detachably engaged with the pins, and a flexible cover secured to the spring roller and stick and resting at its lateral edges on the members and passing over the guide roller.

In testimony whereof I affix my signature.

PRISE A. ENGLE.